Feb. 13, 1940. G. C. AREY 2,190,202
METHOD OF MAKING SAFETY INNER TUBES FOR PNEUMATIC TIRE CASINGS
Original Filed March 11, 1935
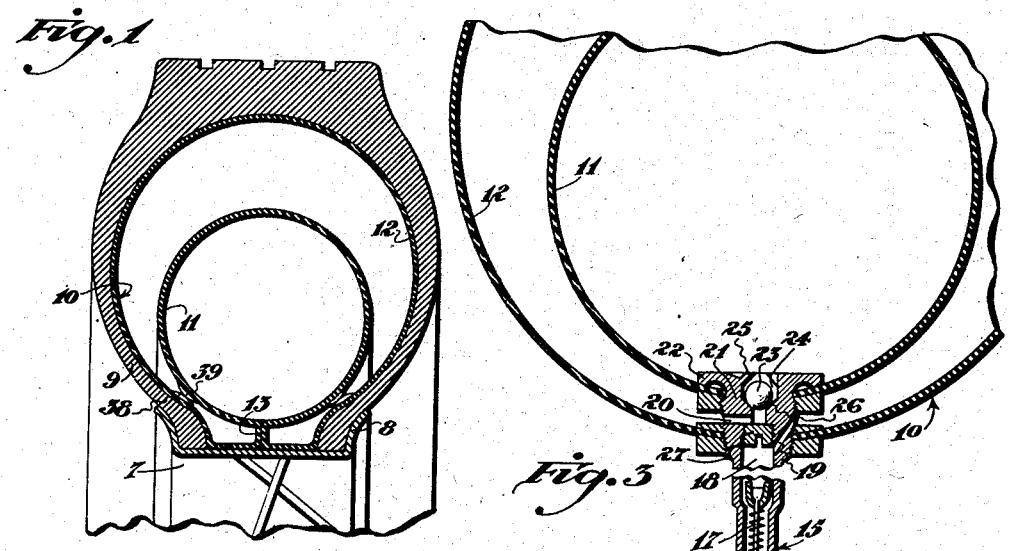
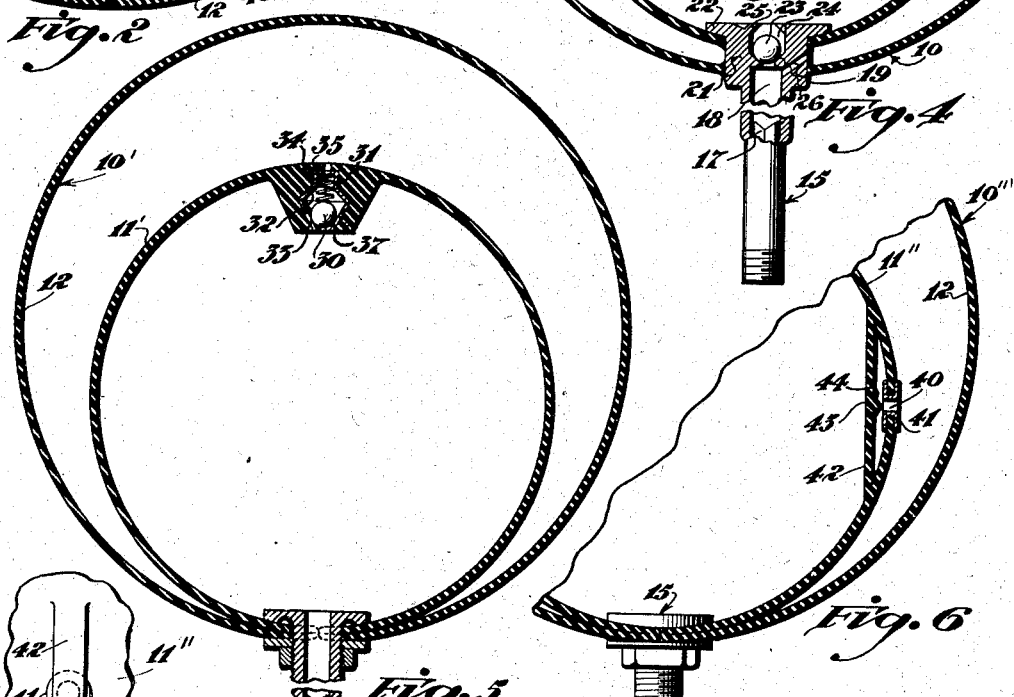
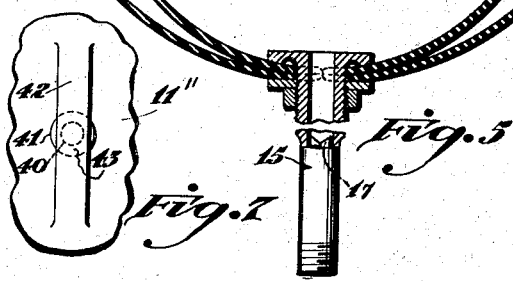
INVENTOR.
BY Gordon C. Arey
Wood & Wood
ATTORNEYS Patented Feb. 13, 1940

2,190,202

UNITED STATES PATENT OFFICE 2,190,202

METHOD OF MAKING SAFETY INNER TUBES FOR PNEUMATIC TIRE CASINGS

Gordon C. Arey, Fort Thomas, Ky.

Original application March 11, 1935, Serial No. 10,348. Divided and this application December 22, 1938, Serial No. 247,277

7 Claims. (Cl. 154—14)

This invention relates to inner tubes for pneumatic tires and is particularly directed to a method of making a safety tube incorporating two chambers, namely, an outer main air chamber and an inner reserve air chamber. This application is a divisional case divided from the copending application, Serial Number 10,348, filed March 11, 1935, in which the inner tubes disclosed herein are claimed.

As pointed out in the parent application just identified, a great many deaths and serious accidents and great inconvenience are constantly occurring because of "blowouts" or the quick escape of air from the conventional tube providing a single chamber. These blowouts occur because of structural weaknesses, excessive pressures, nail punctures, glass cuts, and many other factors. Particularly, have accidents increased, because of blowouts, since the advent of high-speed cars and oversize or balloon tires. These large tires, when collapsed suddenly at a high speed, twist badly and cause entire lack of control.

This improved tube, as disclosed herein and in the parent application, provides a reserve tube as the means for supporting the tire after the main tube is punctured, thereby giving the driver the time to stop the car and even to continue on to a service station. Obviously, the construction of this tube presents unusual problems of fabrication.

It has been the object of the present inventor to provide a novel method of constructing the tube just described which will require a minimum number of steps of fabrication, is performed inexpensively, and results in a structure of great strength, capable of long extended use.

Stated in one manner, the method consists of the formation of a support tube for pneumatic tires by forming one tube within another by the act of disposing or drawing the walls of a single chamber toward each other with the chamber assuming a crescent or arcuate shape in cross section and thereafter securing the adjacent ends of the crescent shaped chamber together along the inner circumference of the tube to form the inside or reserve chamber within the main chamber.

Other objects and further advantages will be more fully apparent from a description of the accompanying drawing, in which:

Figure 1 is a fragmentary transverse sectional view of a tire casing and the improved tube showing the same mounted on a wheel.

Figure 2 is a fragmentary sectional view enlarged out of Figure 1, detailing the seam of the tube structure.

Figure 3 is an enlarged cross sectional view of the inner tube detailing the compound valve and the associated reserve tube.

Figure 4 is a view taken similar to Figure 3, but showing a modified form of valve.

Figure 5 is a view taken similar to Figure 3, but showing separate valves, one a main filling valve entering the reserve tube and the other disposed in the wall of the reserve tube and controlling flow from the reserve tube to the normal tube.

Figure 6 is a fragmentary view taken similar to Figure 3 but showing another form of valve in the reserve tube wall.

Figure 7 is a fragmentary internal face view of the reserve tube wall showing the valve of Figure 6.

Referring to the drawing, the conventional wheel structure is shown at 7, the rim thereof at 8, and the tire casing at 9. The improved tube is generally shown at 10 within the casing 9 and is illustrated in inflated position. As best illustrated in Figures 1 and 2, the chamber, constituted by the tube 11, is disposed within the main chamber constituted by the tube 12.

In the first phase of the method, two walls constitute a main chamber and these walls are brought around into position, whereby the main tube is aptly described as crescent shaped or arcuate. This disposes the reversely folded portions of the tube walls adjacently along the inner circumferential portion of the tube. As shown in the drawing, this crescent-shaped main chamber may be constituted by forming a large tube considerably oversize and pressing the inner wall thereof inwardly, whereby the outer wall of the main chamber, constituting the tube 12, is of greater diameter than the inner wall.

The portions of the wall of the outer chamber are then attached together by vulcanization, so as to seal the tube along the inner circumference. This act completes the inner or reserve chamber, constituted now by the tube 11, the seam being indicated at 13.

It is believed appropriate to include, herewith, a description of the complete tube structure after the valves are incorporated, for it will then be apparent that the formation of the tube in this manner facilitates the assembly and the attachment of the various valve structures.

As shown in Figure 3, the valve stem 15 may be secured in the tube wall by flanges and nuts in the normal manner in which the stem has been secured in a conventional tube. The stem is placed so as to extend through the seam 13 to the reserve tube.

The valve stem 15 has screw threads at its outer end for the attachment of a closure cap thereto. The air is delivered into the stem through the conventional hose, applied in the conventional manner against the end of the stem. A one-way air inlet valve 17, of well known make, is screwed into the outer end of the stem. The passageway 18 of the stem proceeds angularly as at 19 into the outer tube. Diametrically opposite thereto a passageway 20 extends radially to the center of the stem and axially to the interior of the reserve tube.

The attached or inner end of the stem is thickened or includes a head 21 for the inclusion of the aforesaid passageways and includes a flange 22 lying against the inner wall of the reserve tube. Any well-known method of attaching the stem may be used, of course, providing that entry to the two tubes is afforded.

A valve 23 is loosely contained in an enlarged portion of the axial passageway 24 leading into the reserve tube. Radially inwardly extended tangs or portions 25, deformed from the metal of the stem at its extreme inner end, prevent displacement of the valve from its chamber, but permit free flow of air to the reserve chamber when the valve is unseated. The valve is adapted to seat on a tapered valve seat 26, when moved outwardly by pressure within the reserve tube, but cannot seat against the retaining tangs. A plug 27 is screwed into the main passageway of the stem between the passageway 19 and the passageway 20 and may be conveniently unscrewed upon removal of the control valve 17 in the stem to permit insertion of a tool and unseating of the valve 23 when the air is to be released from the reserve tube.

As shown in the form disclosed in Figure 4, the main passageway 18 of the valve stem may extend directly to the reserve tube with a valve seat 26 formed therein between the reserve tube and the angular passageway 19 leading to the main tube. The valve stem may be vulcanized in place as shown in Figure 4 in accordance with prevailing practice.

Now in either form the air is free to flow equally to either chamber, that is either the reserve tube or the main tube, although it is believed preferable to cause the air to flow through the outer chamber into the inner or reserve chamber. The tubes are figured as to size and relation to provide the same cubical content for each. The respective passageways and the clearance for the inner valve may be of cross sectional areas providing uniform or equal passageways for uniform flow to the respective chambers.

The valve 23 floats or unseats freely so that, although the pressures in the respective chambers may be unequal immediately after inflation, movement of the car will cause unseating of the valve. By the arrangement shown in Figure 3, the inner chamber cannot become inflated at a higher pressure than the outer chamber since the air must first pass through the outer chamber. Therefore, the valve can bleed air from the outer to the inner chamber until equal pressure exists. Accordingly, this arrangement, considering these two forms, is preferred.

However, if the rate of flow is properly controlled by the size of the passageways, the arrangement of Figure 4 is equally efficient. Also, a third arrangement is available, as shown in Figure 5, if desired.

In this third form, the valve stem is of conventional structure, that is, encloses the single conventional inlet valve 17. This stem is secured through the tube walls at the seam so that its passageway enters the reserve chamber only. There is no space between the tube walls immediately adjacent the seam, the walls separating gradually due to the different diameters of the tubes. In the opposite or outer wall of the reserve tube, a valve 30 is mounted. The tube wall is thickened and molded about a sleeve element 31. This sleeve includes two adjacent tapered seats 32 and 33. A very light coil spring 34, having a footing on an internal abutment flange 35 at the outer end of the stem, holds the valve against the inner seat, which seat is only an abutment since the seating taper of the valve is longitudinally slotted as at 37 permitting flow of air past the valve even when seated.

Thus, when air flows into the reserve tube 11' at the normal delivery rate, the valve will not seat on the outer seat 32 but will permit the air to flow into the outer tube until the proper pressure is reached in both tubes. Sudden relief of pressure in the outer tube 10' will cause the valve 30 to operate relative to the passageway or port for restraining the air in the reserve tube under the influence of the normal reserve pressure of the reserve tube. This port is of an effective cross-sectional area at least substantially as great as that of the valve mechanism in the valve stem through which the tube is inflated.

It will be understood that the reserve tube wall may be of a thickness and elasticity permitting this expansion when the emergency occurs. At the same time, it will be sufficiently rigid to normally retain the size shown when air also enters the main chamber.

As shown in Figures 6 and 7, another form of valve is provided which is highly efficient and will not get out of order. It is of great importance that this valve in the reserve tube wall requires no attention since it is inaccessible. A port 40 is provided in the wall of the reserve tube. This port may have a thickened margin for valve seating and toughening purposes or may include an eyelet 41 as shown for this purpose.

A strip 42 of rubber, formed integrally or vulcanized to the reserve tube wall, is disposed across this port on the inside of the reserve tube. This strip, since it is straight, is not in contact with the normally curved tube wall. A valve portion 43 of the strip in the form of a conical teat 44 extends outwardly adjacent the port and in axial alignment therewith.

Now as shown with the tubes inflated, this teat is not seated nor will it seat as air is admitted to the reserve chamber and through the port into the normal chamber in filling the tube. However, when the pressure drops abruptly in the outer chamber 10", the standing pressure within the reserve chamber 11" presses the elastic strip 42 outwardly and seats the valve restraining the air in the inner chamber.

This pressure sealing the reserve chamber will be aided by the changing curvature of the reserve tube wall as it expands since the teat of the elastic strip will be moved closer to the wall of the reserve tube. This occurs since the curvature of the wall becomes less. Now it will also be evident that the normal elasticity of the strip tending to keep it straight will resist flexing of the strip under inside pressure during filling. In other words, the built up pressure, suddenly relieved through the port when there is a puncture, quickly seats the valve, and the changing curvature of the reserve tube wall tends to aid in keeping it seated.

In Figure 1 the reserve tube is illustrated in contact, as at 38, with the sides of the outer or main tube. This seating of the reserve tube prevents swaying thereof within the main tube which may well occur since the pressures in these tubes normally are equal. Also, the tube walls may be thickened at intervals around their circumferences to provide points of contact, as indicated at 39, whereby the tubes will not become worn through their respective walls in the event of relative movement causing rubbing. The air is free to pass between the spaced thickened portion.

Having described my invention, I claim:

1. The method of making a rubber tube for tire casings, comprising the following steps; forming a large oversize tube, indenting the inner periphery of said tube to form an inner tube contained within the main tube body, and vulcanizing the abutting portions of the tube brought together in the formation of the inner tube.

2. The method of making an inner tube for pneumatic tires, said tube having inner and outer chambers comprising the steps of; first, providing an annular chamber constituted by inner and outer walls and of crescent form in cross section, and, thereafter, sealing together the adjacent and connected ends of the walls to form the inner chamber within the annular chamber of crescent form.

3. The method of making an inner tube for pneumatic tires, said tube having inner and outer chambers, comprising the steps of: forming an annular tube, arranging the walls of said tube so that they form a crescent space in cross section, and therafter closing the space within the crescent space by vulcanizing the adjacent ends of the crescent-forming walls together.

4. The method of making a support tube for a tire casing, comprising the steps of forming a main chamber of annular shape, drawing the annular side portions of the walls of the main chamber toward each other to form a chamber of arcuate shape in cross section, and thereafter sealing the space enclosed by the arcuate main chamber to form a reserve chamber.

5. A method for forming a compound tube for a pneumatic tire, which comprises; providing circumferential walls in spaced relation to define an annular air chamber intermediate them, and then drawing the annular side portions of the walls of the chamber together and connecting said side portions to provide a common circumferential connection for the walls to constitute a second air chamber within the first.

6. The method of making a compound inner tube for pneumatic tires which consists in superposing sheet material in relatively different transverse dimensions, drawing together each of the respective opposite ends to bring the corresponding ends to a coinciding juncture and interconnecting the material of the opposing junctures, thereby producing a smaller diameter inner tube within a larger diameter outer tube sealed at the said junctures.

7. A method of making a double chamber safety tube unit which comprises forming a tube having a closed cross section, indenting one portion of said tube to form two crescent-shaped walls in substantially concentric relation to form one crescent-shaped chamber and then joining the points of the crescent to form two closed chambers, one within the other.

GORDON C. AREY.